(12) United States Patent
Ayers et al.

(10) Patent No.: US 8,079,116 B2
(45) Date of Patent: Dec. 20, 2011

(54) TIE-DOWN STRAP DEVICE

(76) Inventors: Aaron R Ayers, Granite Falls, WA (US);
Donald R. Young, Tulalip, WA (US);
Thomas John Lothrop, Bend, OR (US)

( * ) Notice: Subject to any disclaimer, the term of this patent is extended or adjusted under 35 U.S.C. 154(b) by 691 days.

(21) Appl. No.: 12/060,813

(22) Filed: Apr. 1, 2008

(65) Prior Publication Data

US 2009/0241307 A1    Oct. 1, 2009

(51) Int. Cl.
*B65D 85/00* (2006.01)
*B25B 25/00* (2006.01)

(52) U.S. Cl. ............... 24/68 CD; 206/388; 410/100; 383/902; 254/266; 254/213; 150/154

(58) Field of Classification Search .................. None
See application file for complete search history.

(56) References Cited

U.S. PATENT DOCUMENTS

| | | | | |
|---|---|---|---|---|
| 2,149,663 A * | 3/1939 | Brighten | ............ | 24/265 R |
| 6,679,743 B1 * | 1/2004 | Gerber | ............ | 441/84 |
| 6,789,671 B2 * | 9/2004 | Morrison et al. | ............ | 206/388 |
| 6,880,702 B1 * | 4/2005 | Colorado | ............ | 206/388 |
| 7,165,294 B2 * | 1/2007 | Surdam | ............ | 24/68 CD |

\* cited by examiner

*Primary Examiner* — Jack W. Lavinder

(57) ABSTRACT

A tie-down strap system designed to be integrated with the plurality of tie-down straps that are currently on the market. A system for the protection of the tightening mechanism, the storage of excess strapping during use, a storage device when not used as a tie-down strap, a hanging system when not in used as a tie-down strap, and a termination feature that prevents the free end of the strap from sliding through the tightening mechanism.

10 Claims, 4 Drawing Sheets

TIE-DOWN STRAP DEVICE

CROSS REFERENCE TO RELATED APPLICATIONS:

U.S. Pat. No. 7,296,326
U.S. Pat. No. 7,171,731
U.S. Pat. No. 7,165,294
U.S. Pat. No. 6,789,671
U.S. Pat. No. 6,651,854
U.S. Pat. No. 6,604,618
U.S. Pat. No. 6,318,612
U.S. Pat. No. 6,296,094
U.S. Pat. No. 6,138,331
U.S. Pat. No. 5,947,354
U.S. Pat. No. 5,605,112
U.S. Pat. No. 5,402,557

FEDERALLY SPONSORED RESEARCH OR DEVELOPMENT

Not Applicable

JOINT RESEARCH AGREEMENTS

Not Applicable

BACKGROUND OF INVENTION

1. Field of the Invention

The present invention relates generally to tie-down straps. More specifically, the invention of a tie-down strap system having a tie-down strap, a secured enclosure, a drawstring, a locking mechanism on the drawstring, a termination feature on the length adjusting end of the strap.

2. Description of the Related Art

The increase in the use of tie-down straps has greatly increased with the amount of ATVs, snowmobiles, and other recreational vehicles on the market today. The tie-down strap is the most effective way to secure these and other heavy loads.

Many states have implemented laws that require citizens to secure loads while transporting material, equipment, and debris. The need of a reliable securing system has also contributed to the growth in the tie-down strap market to comply with these new regulations.

The straps on the market today do a great job of securing loads, but there is no simple solution for the protection for the tightening mechanism from the elements and the containment of the excess strapping both during and after use.

The tie-down strap tends to become tangled amongst itself and specifically other straps while in storage. It can take awhile to sort through the straps and untangle the mess of strapping.

The tie-down strap in general consists of 2 parts. The first part is the fixed part of the strap that typically consists of a hook or other attachment devise and a length of strap that is permanently attached to the tightening mechanism. The second part of the strap is the length adjusting part that is threaded through the tightening mechanism. This part of the strap usually has a hook or other attachment devise and a loose end which adjusts the overall length of the strap. While throwing the tie-down strap over a load, the end of the strap which is the excess or loose end, tends to come out of the tightening mechanism further frustrating users.

The excess strap as stated above often flaps in the wind and is usually tied-off to take-up the excess length. This excess strapping is a nuisance and can become dangerous.

Finally, there are products that have tried to solve some of the before mentioned issues, but none have created a complete system that could be integrated in the manufacturing process with all components installed in a simplistic manner. All current solutions must be purchased separately to solve before said problems and involve individual parts and components and do not represent a complete and easy to use system.

BRIEF SUMMARY OF THE INVENTION

The problems with prior art have been overcome by the present invention, which provides a cinchable enclosure that is secured to the tie-down strap. While in use the enclosure contains the locking mechanism and excess strapping. While in storage the enclosure contains and secures all strapping components. The system allows an option to hang the embodiment by the attachment feature (ie hook) on the fixed strap end while all strapping components are stored within the enclosure. The enclosure will contain all excess strapping and the tightening system during use so the exposure to the elements is limited. The length adjustable loose end of the strap has a termination feature preventing the strap from sliding through the tightening mechanism. This invention is a simple low cost solution that can easily be integrated into existing tie-down strap manufacturing processes.

In addition, this system can be produced with the same parts to integrate with existing tie-down straps previously purchased to enhance their performance and allow for similar capabilities.

Finally, we believe the above invention will be a low cost alternative to other more complicated systems on the market. Although this is a low cost alternative, it surpasses all other designs from usability, novelty, and functionality.

DETAILED DESCRIPTION OF THE INVENTION

Figure 1:
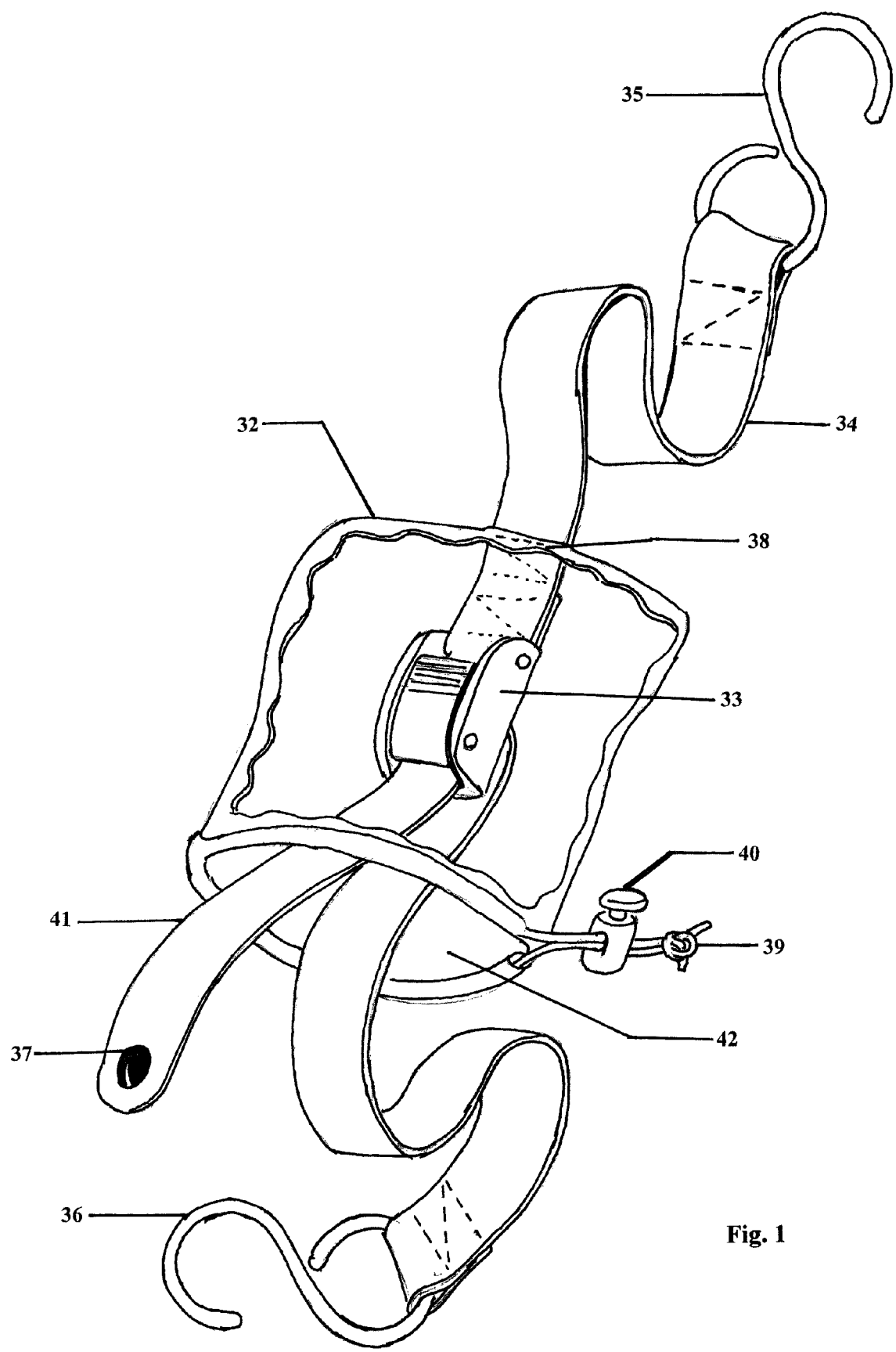
FIG. 1 is a cut-away view showing one of the possible embodiments of the present invention of the entire tie-down strap system.
Figure 2:
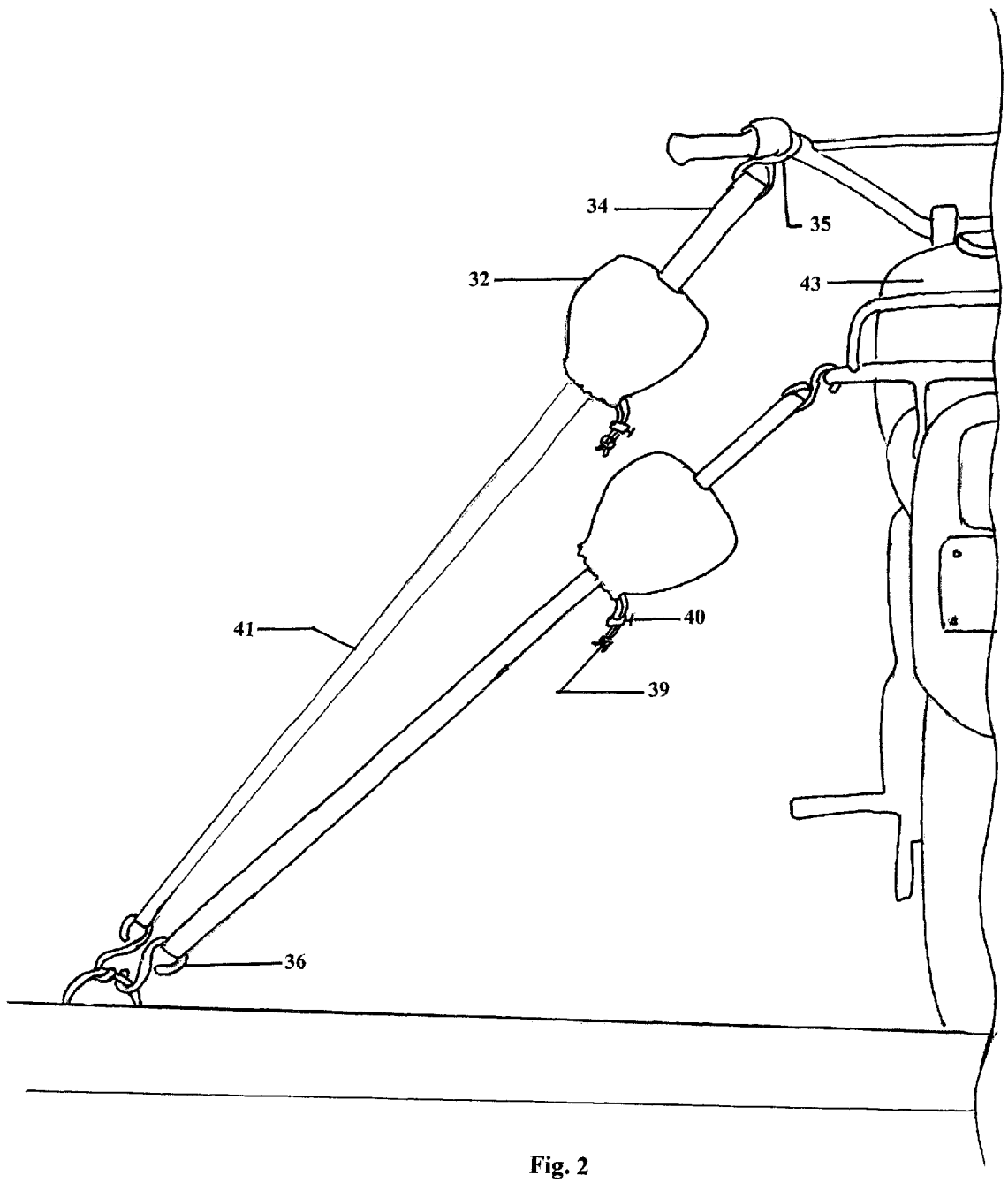
FIG. 2 is an environment perspective of the tie-down strap system in use holding down a motor vehicle.
Figure 3:
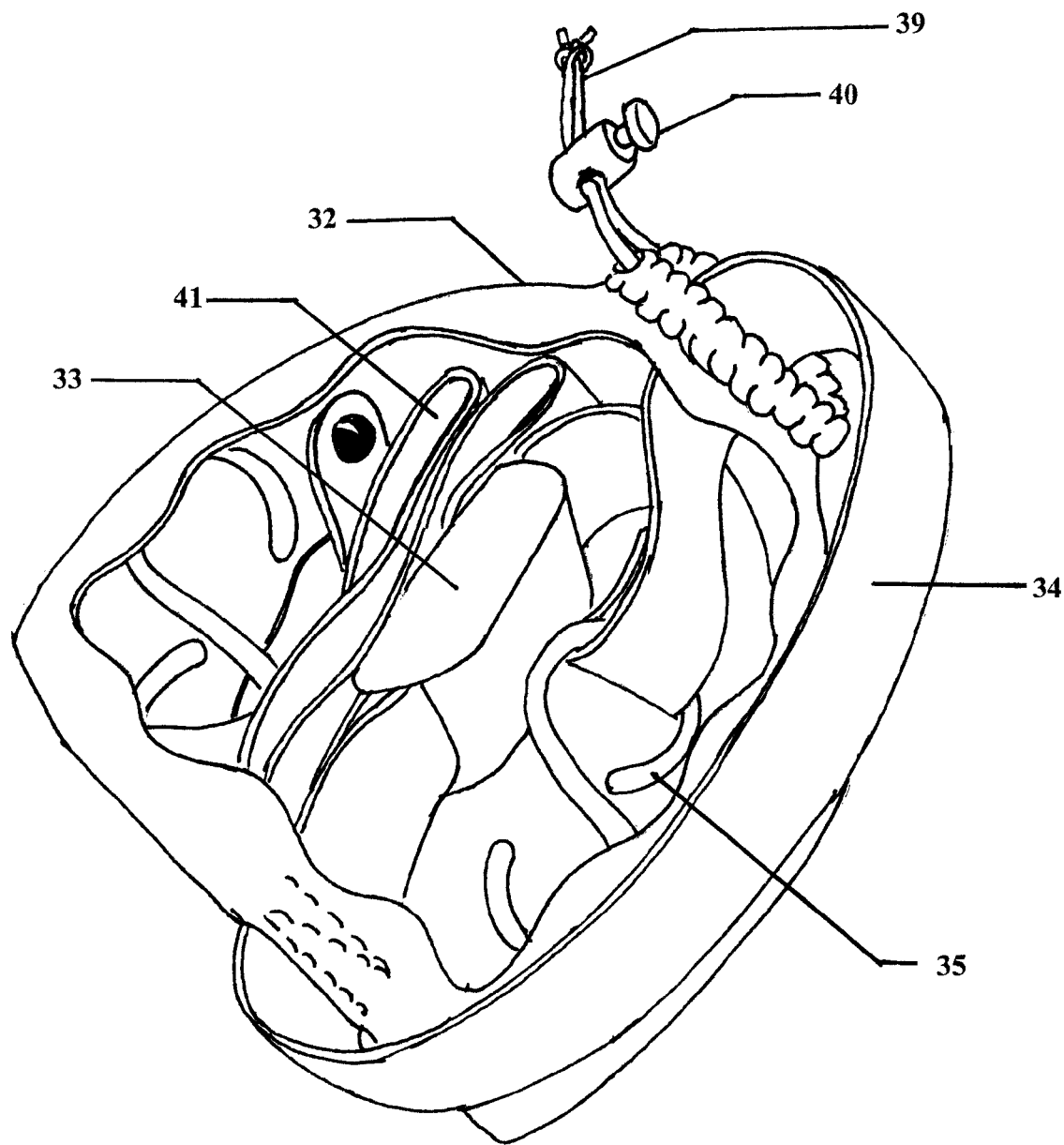
FIG. 3 is a perspective of the invention show in a storage solution
Figure 4:
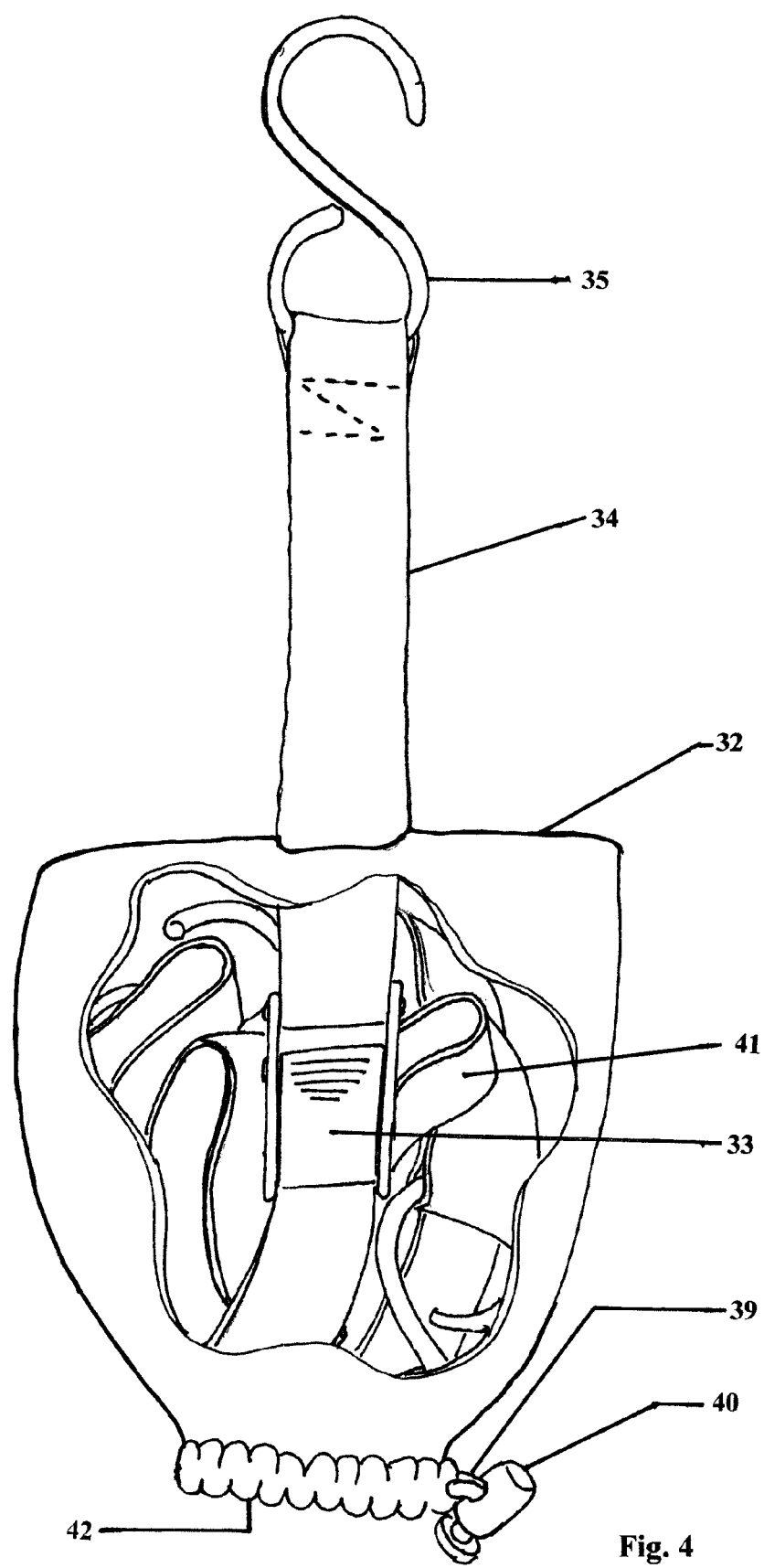
FIG. 4 is a perspective of the invention shown in a hanging storage solution

The present invention, as shown in FIGS. 1, 2, 3, and 4 is a tie-down strap system. Starting with FIG. 1 there is shown a possible embodiment of a tie-down strap system. As shown in the drawing, there is a tie-down strap consisting of the following: a ratchet-type tightening mechanism 33, a fixed strap 34 connected to the tightening mechanism 34, with an attached hook 35, a length adjustable loose end of the strap 41 that is used to adjust overall strap length, and a hook 36 that is the second part of the attachment system. Those skilled in the art will appreciate that the following components are shown merely as one design for the strap system and that there is a plurality designs of tie-down straps that are currently on the market. There are several types of strap end attachment features 35 and 36 that are attachment points; several types of tightening mechanisms such as, but not limited to ratchets, winches, cams, over-center devices, and pressure devices that could represent the tightening mechanism 33; there are also several types of strapping material that could be used such as, but not limited to, ropes, chains, cables, or cords. The enclosure 32 is shown to be made from a material made from fabric, but could be made of several other types of fabrics such as, but not limited to: nylon, neoprene, polyester, canvas, leather, or other like materials. The enclosure 32 has an open top end 42, a drawstring 39, and locking mechanism 40. The locking mechanism 40 is shown as a typical spring type system, but one skilled in the art of invention would know that there are several types of mechanisms that would fall within the current scope of invention. The bottom of the enclosure has a void 38 which allows the hook 35 and the strap 34 to pass through. The void 38 is shown to be sewn directly to the strap 34 in the manufacturing process, or could be left open to be sold to individuals that want to improve the performance of existing tie-down straps. The length adjustable loose end of the strap 41 is the embodiment of the strap that is threaded through the tightening mechanism 33 and shows a termination feature 37. The termination feature 37 is attached to the length adjustable loose end of the strap 41 for the purpose of not allowing the strap to pull through the tightening mechanism 33. The termination feature 37 is shown in the form of a button, but it would have a similar capabilities if it were made of a tab, grommet, fastener, or, extra strapping materials. The opposite end of loose strap that is threaded through the tightening mechanism is shown to have a hook 36 which is the second attachment feature. FIG. 2 is an environment perspective of the strap system in use holding down a motor vehicle 43. The figure shows the fixed end consisting of the strap 34 and attachment feature 35 securing the motor vehicle 43. The enclosure 32 is holding the tightening mechanism 33, excess strapping material remaining from the loose length adjusting end of the strap 41, with the termination feature 37 attached. The drawstring 39 is cinched tight by means of the locking mechanism 40, closing the open top end 42. FIG. 3 shows a perspective of the invention shown in a storage solution. The enclosure 32 is shown with all components of the tie-down strap within the enclosure. The fixed end of the strap 34 is shown tucked into before said enclosure 32 cinched with the drawstring 39 and locked in place with the locking mechanism 40. FIG. 4 shows a perspective of the invention shown in a hanging storage solution. The enclosure 32 is shown with all components of the tie-down strap within the enclosure. The only exception is the fixed end of the strap 34 is shown with the hook 35 to be extended so that the enclosure 32 can be stored in a hanging position. The enclosure 32 is cinched with the drawstring 39 and locked in place with the locking mechanism 40.

We claim:

1. A tie-down strap device comprising
a first strap having a first end and second end having a fastening device attached thereto,
a second strap having a first end and second end having a second fastening device attached thereto,
a tightening mechanism for adjusting the tension applied to the straps, wherein the first end of the first strap is fixed to the tightening mechanism and the first end of the second strap is threaded through the tightening mechanism ending in a adjustable loose end of the second strap extending from the tightening mechanism,
a substantially cylindrical enclosure having a first open end and an opposite second closed end, wherein the first open end includes a mechanism for closing the first open end, the second closed end receives and is fastened about the first strap positioning the tightening mechanism attached to the first end of the first strap within the substantially cylindrical enclosure, wherein the second end of the first strap extends outwardly from the closed end of the substantially cylindrical enclosure and the second end of the second strap extends outwardly from the open end of the substantially cylindrical enclosure,
whereby the substantially cylindrical enclosure has the capacity to store the adjustable loose end of the second strap and the tightening mechanism at the same time.

2. A tie-down strap device of claim 1 wherein said adjustable loose end of the second strap includes a termination feature preventing said adjustable loose end of the second strap from sliding free of said tightening mechanism.

3. A tie-down strap device of claim 1 wherein said first and second strap fastening devices are hooks.

4. A tie-down strap device of claim 1 wherein said substantially cylindrical enclosure comprises leather, nylon, neoprene, polyester, or other synthetic material.

5. A tie-down strap device of claim 1 wherein said mechanism for closing the first open end of said substantially cylindrical enclosure comprises a draw string.

6. A tie-down strap device of claim 5 wherein said draw string includes an adjustable positioning locking mechanism.

7. A tie-down strap device comprising
a first strap having a first end and second end,
an adjustable tightening mechanism for adjusting the tension applied to the strap, wherein the first end of the first strap is fixed to the tightening mechanism,
a substantially cylindrical enclosure having a first open end and an opposite second closed end, wherein the first open end includes a mechanism for closing the first open end, the second closed end receives and is fastened about the first strap, wherein the first strap extends through the closed end positioning the tightening mechanism attached to the first end of the first strap within the substantially cylindrical enclosure, wherein the second end of the first strap extends outwardly from the closed end of the substantially cylindrical enclosure.

8. A tie-down strap device of claim 7 wherein said substantially cylindrical enclosure comprises leather, nylon, neoprene, polyester, or other synthetic material.

9. A tie-down strap device of claim 7 wherein said mechanism for closing the first open end of said substantially cylindrical enclosure comprises a draw string.

10. A tie-down strap device of claim 9 wherein said draw string includes an adjustable positioning locking mechanism.

* * * * *